(12) United States Patent
Zisler et al.

(10) Patent No.: US 7,705,496 B2
(45) Date of Patent: Apr. 27, 2010

(54) HOUSING FOR AN ELECTRICAL MACHINE

(75) Inventors: Michael Zisler, Euerdorf-Wirmsthal (DE); Thomas Then, Bad Neustadt (DE)

(73) Assignee: Siemens Aktiengesellschaft, Munich (DE)

( * ) Notice: Subject to any disclaimer, the term of this patent is extended or adjusted under 35 U.S.C. 154(b) by 141 days.

(21) Appl. No.: 11/576,507

(22) PCT Filed: Sep. 27, 2005

(86) PCT No.: PCT/EP2005/054834

§ 371 (c)(1),
(2), (4) Date: Apr. 2, 2007

(87) PCT Pub. No.: WO2006/037737

PCT Pub. Date: Apr. 13, 2006

(65) Prior Publication Data

US 2009/0026893 A1    Jan. 29, 2009

(30) Foreign Application Priority Data

Oct. 5, 2004    (DE) .................... 10 2004 048 461

(51) Int. Cl.
*H02K 5/20* (2006.01)
*H02K 9/02* (2006.01)

(52) U.S. Cl. .................... 310/60 A; 310/58; 310/59; 310/89

(58) Field of Classification Search ............... 310/60 A, 310/89, 58, 59, 52
See application file for complete search history.

(56) References Cited

U.S. PATENT DOCUMENTS

| 3,238,401 | A | 3/1966 | Baclawski |
| 4,453,097 | A | 6/1984 | Lordo |
| 4,839,547 | A * | 6/1989 | Lordo et al. ............... 310/60 A |
| 5,081,384 | A * | 1/1992 | Rausch ........................ 310/63 |
| 2003/0102740 | A1 * | 6/2003 | Marioni ....................... 310/87 |
| 2004/0124720 | A1 | 7/2004 | Condamin et al. |
| 2005/0104458 | A1 * | 5/2005 | Then et al. .................... 310/58 |

FOREIGN PATENT DOCUMENTS

| CN | 1502161 A | 6/2004 |
| DE | 10 74 734 | 2/1960 |
| DE | 89 12 578 U1 | 4/1991 |
| DE | 295 13 958 U1 | 2/1997 |
| DE | 196 27 333 | 12/1999 |

(Continued)

*Primary Examiner*—Quyen Leung
*Assistant Examiner*—Leda Pham
(74) *Attorney, Agent, or Firm*—Henry M. Feiereisen; Ursula B. Day

(57) ABSTRACT

The housing of an electrical machine should, despite efficient cooling, be provided with a more compact design. To this end, the invention provides that the cooling ducts (2) of a housing (1), which is preferably provided in the form of an aluminum extruded profile, are left open toward the inside. The inner walls of the cooling ducts (2) are then formed by an inserted stator pack (4). This enables the corner areas of the housing to be kept free for assembly and the reduction of material for manufacturing the housing (1). In addition, due to the open cooling air ducts (2), thin wall thicknesses in the profile and thus small motor dimensions while simultaneously having a large cooling duct cross-section can be realized.

5 Claims, 4 Drawing Sheets

FOREIGN PATENT DOCUMENTS

| | | |
|---|---|---|
| EP | 0 385 596 A2 | 9/1990 |
| EP | 0 560 993 B1 | 7/1996 |
| EP | 0 849 858 A1 | 6/1998 |
| GB | 13 91 957 | 4/1975 |
| JP | 02269432 A | 11/1990 |
| JP | 05095651 | 4/1993 |
| WO | WO 03023941 A1 | 3/2003 |
| WO | WO 2004036719 A1 | 4/2004 |

\* cited by examiner

HOUSING FOR AN ELECTRICAL MACHINE

BACKGROUND OF THE INVENTION

The present invention relates to a housing for an electrical machine, comprising an outer wall and at least one cooling duct within the outer wall, through which cooling duct a coolant can be transported.

In order to increase power, electric motors are cooled using an air stream or another cooling medium. In this case, the air stream is frequently generated by an additional fan (axial or radial fan) and conducted across or through the motor.

Since the present invention relates particularly to an external ventilation concept, the customary cooling principles of externally ventilated motors are briefly mentioned below. Firstly, corner cooling systems are known for extruded profiles, in which systems the cooling stream flows through the corner regions of the extruded profile. However, one disadvantage of this is that a design of this type is unfavorable for motor assembly since no cutouts for screws can be provided in the corners.

Furthermore, hood jackets with external fans which are placed over the motor are known for cooling electric motors. In this case, the motor is cooled with a cooling-air stream on three sides. However, one disadvantage of this system is the increased physical volume.

A further cooling concept is based on providing cooling ducts, for example for air cooling, in the laminated core of a motor without a housing. In this case, the coolant flows directly through punched-out portions in the stator core.

SUMMARY OF THE INVENTION

The object of the present invention is to propose a housing for an electrical machine which is simple to produce and permits powerful cooling with the smallest possible physical volume of the housing.

According to the invention, this object is achieved by a housing for an electrical machine comprising an outer wall and at least one cooling duct within the outer wall, through which cooling duct a coolant can be transported, wherein the at least one cooling duct is closed off toward the outside by the outer wall and is open toward the inside substantially over the entire length of the housing.

Therefore, according to the invention, the coolant stream can be conducted intensively and directly across the laminated stator core. The lost heat is thus dissipated directly from the point of origin and therefore in an optimum fashion without the physical volume of the motor being significantly increased.

The housing preferably has a cross section of cross-like design. On account of this, the corner regions can be kept free, with the result that access from the rear of the motor, which is expedient for assembly, is provided.

Furthermore, webs, which form the walls of cooling ducts, can project radially inward in the housing and define a cylindrical free space in the interior of the housing. The webs then not only have the function of forming the walls of cooling ducts but also the function of holding a stator core of the electrical machine.

In accordance with a particularly preferred embodiment, the housing is designed as an extruded aluminum profile. Profiles of this type are very easy to produce. Thin wall thicknesses are possible in the profile by virtue of the coolant ducts in the housing which are open over the entire housing length since extrusion technology would otherwise require greater wall thicknesses in the case of closed ducts on account of the tolerances required. In addition, smaller motor dimensions with, at the same time, large cooling-duct cross sections can be produced on account of the thinner wall thicknesses. This leads to savings on material and therefore to a simple housing design but also to a very compact construction for externally ventilated motors. Furthermore, an extruded aluminum profile of this type is very robust.

If the stator core has a shorter axial length than the housing, at least one pipe can be arranged axially upstream or downstream of the stator core, this pipe closing off the at least one cooling duct at least partially toward the inside. As a result, coolant can be forcibly conducted through the cooling ducts upstream and downstream of the stator core.

A pipe of this type can closely adjoin the stator core. In this way, it is possible to ensure that particles of dirt from the cooling medium do not enter the interior of the electrical machine.

Instead of one or more pipes upstream and/or downstream of the stator core, it is also possible to arrange a pipe radially across the stator core, this pipe closing off the cooling ducts toward the inside. As a result, a greater sealing action can be achieved under certain circumstances.

The electrical machine according to the invention can also have an end plate to which the at least one pipe is integrally connected. By way of example, the end plate can be produced together with the pipe as a common casting. As a result, the outlay required for assembly of the electrical machine can be reduced.

Particular advantages are also provided on account of the fact that the cooling ducts which are open toward the inside allow the geometry and design of the stator section to be readily optimized for different types of cooling, for example for water cooling, external ventilation, self-cooling and the like.

BRIEF DESCRIPTION OF THE DRAWING

The present invention will now be explained in greater detail with reference to the attached drawings, in which.

The exemplary embodiments which are described in greater detail below represent preferred embodiments of the present invention.

DETAILED DESCRIPTION OF PREFERRED EMBODIMENT

Figure 1:
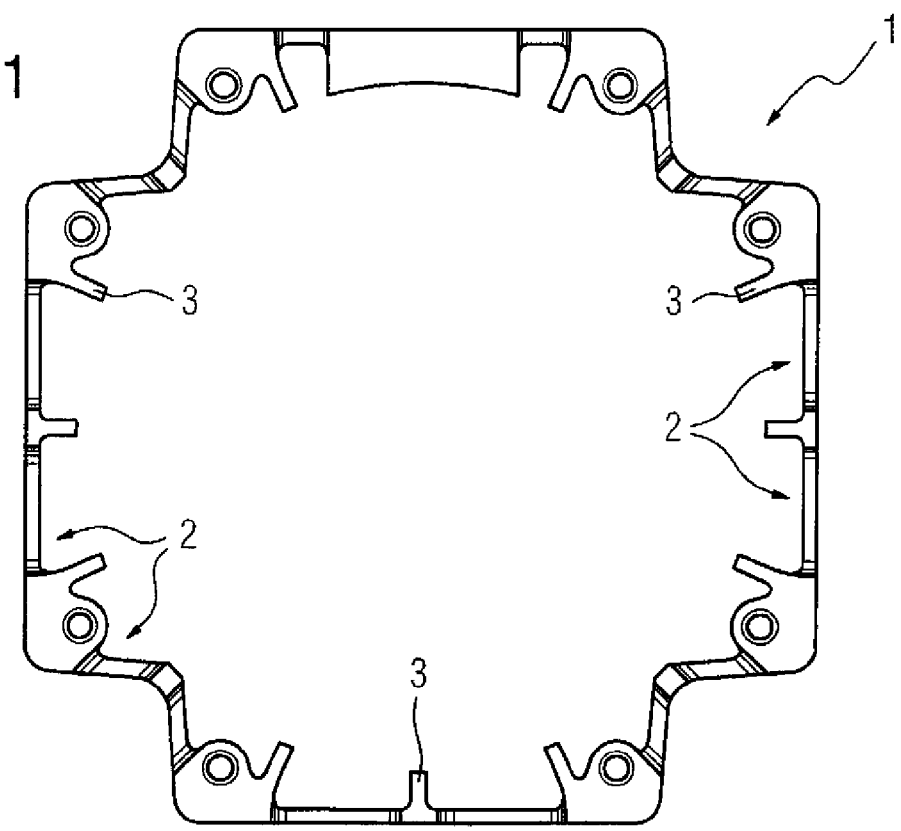
FIG. 1 shows a cross section through a housing according to the invention.
Figure 2:
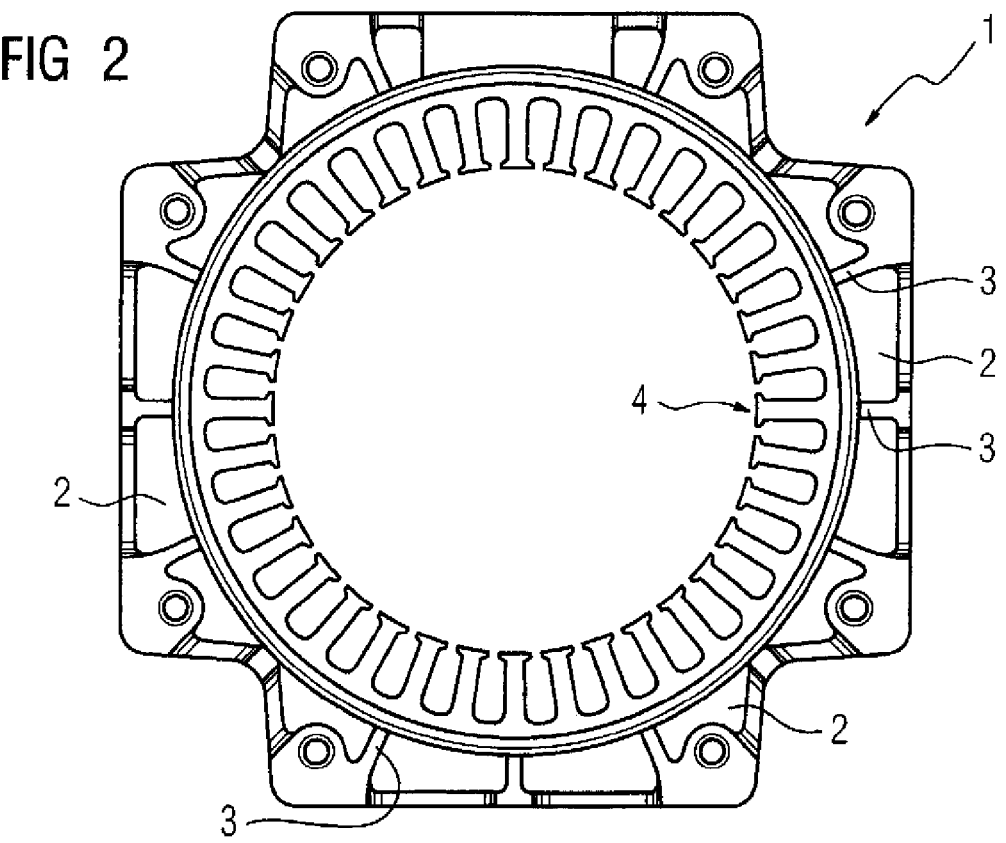
FIG. 2 shows the cross section of FIG. 1 with a stator core inserted.

The housing 1, which is shown in cross section in FIG. 1, of an electrical machine is produced as an extruded aluminum profile. Cooling ducts 2 which are open toward the inside run along the longitudinal axis of the housing 1 over the entire housing length. The cooling ducts 2 are each separated from one another in the circumferential direction by webs 3. The webs 3 define a circular, cylindrical interior into which a stator core 4 is inserted, as illustrated in FIG. 2. This stator core 4 simultaneously serves as an inner wall of the cooling ducts 2. The webs 3 serve both to hold the stator core 4 and also to seal off the cooling duct 2 from an adjacent cooling duct 2 by resting against the stator core 4 in an appropriate force-fitting manner. On account of the profile, which is open toward the inside, of the housing 1, no internal wall for the cooling duct needs to be provided and smaller housing dimensions can be implemented in the radial direction.

Figure 3:
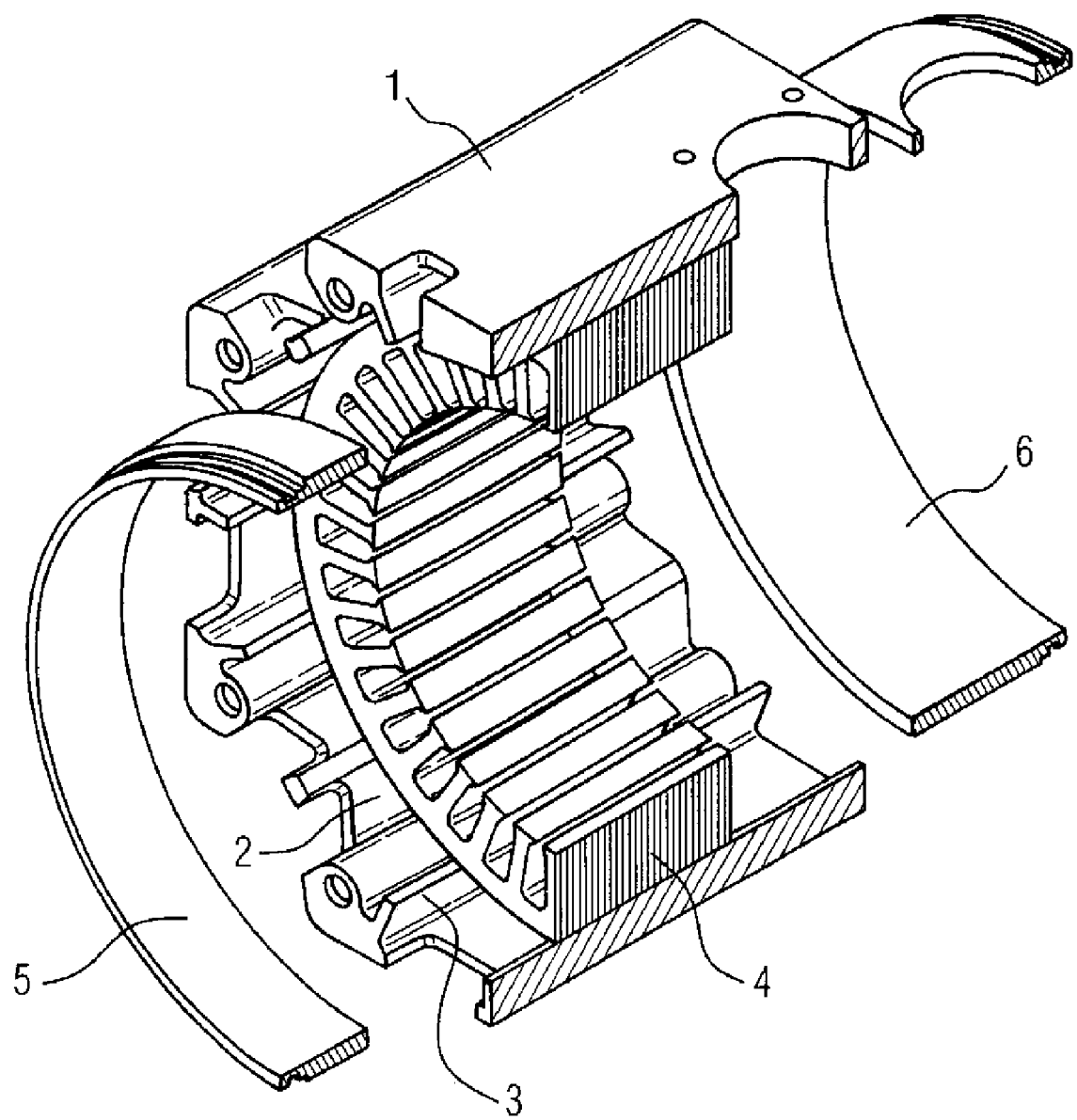
FIG. 3 shows a perspective longitudinal section view through a plurality of components of an electrical machine according to the invention.

FIG. 3 shows a perspective longitudinal section view through the housing 1, including the inserted stator core 4. The cooling ducts 2 and the webs 3 which support the stator core 4 can be seen in this figure too. The stator core 4 is shorter than the housing 1 in the axial direction. The open profile is therefore sealed off from the interior of the motor axially adjacent to the stator core 4 by pipes 5 and 6. The coolant, and in particular the cooling-air stream, is forced into the cooling ducts 2 through these two pipes 5 and 6, with the result that dirt from the interior of the electrical machine and from the interior of the motor are kept apart. The pipes 5 and 6 can simultaneously assume a centering and sealing function for the end plate.

Figure 4:
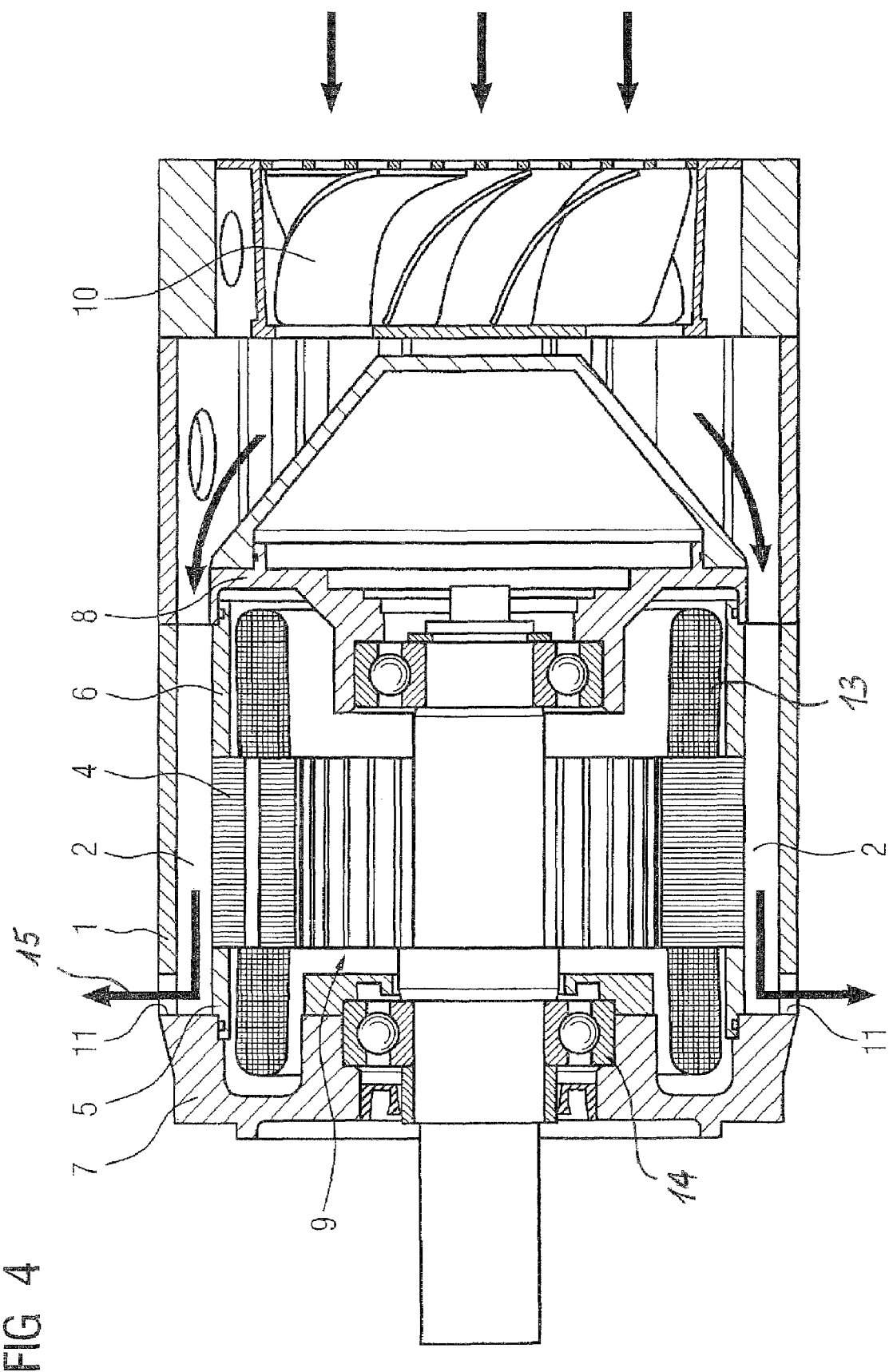
FIG. 4 shows a longitudinal section through an electrical machine according to the invention with a coolant flow.

FIG. 4 illustrates a longitudinal section through a complete motor with external ventilation. The pipes 5 and 6 adjoin the stator core 4 on the left and right, with end windings 13 extending out of the stator core 4 from opposite sides. Said pipes constitute the connections to the end plates 7 and 8 which are configured to support bearings 14 radially directly underneath the end windings 13. The cooling ducts 2 are therefore closed toward the inside, with the result that no dirt can penetrate the interior 9 of the motor.

Figure 5:
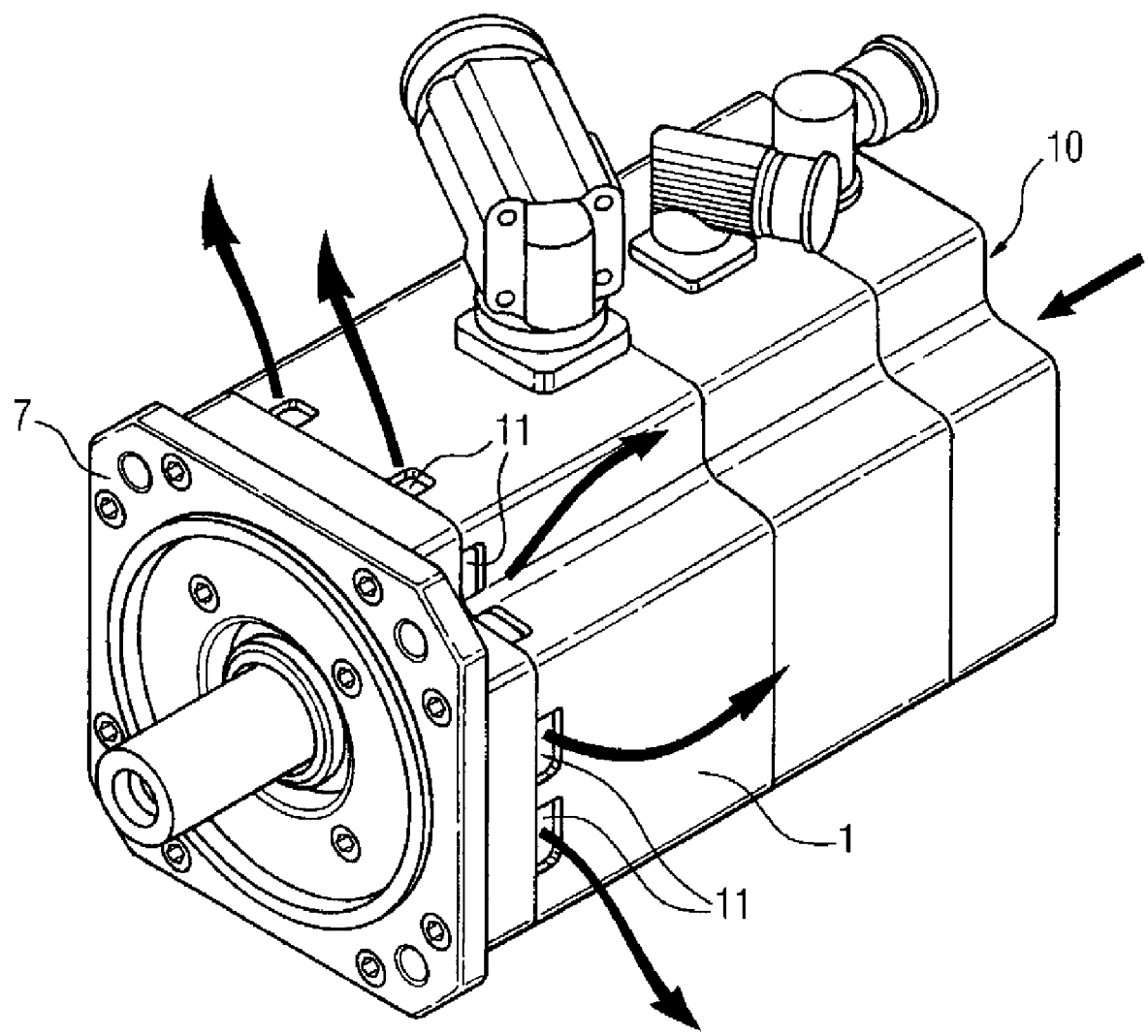
FIG. 5 shows a perspective view through an electrical machine according to the invention with the coolant flow shown.

A fan 10 is provided such that it adjoins the right-hand end plate 8. In accordance with the drawn arrows, said fan draws in cooling air in an axial direction, as indicated by the arrows and conveys cooling air into the cooling ducts 2, through said cooling ducts and out of radially directed openings 11 toward the outside on the opposite side of the motor. As indicated by arrow 15, the end plate 7 serves as baffle to deflect the outgoing coolant flow by 90°. The cooling-air stream can therefore be conducted intensively and directly across the laminated stator core 4. As a result, the lost heat is dissipated directly from the point of origin and the physical volume of the motor is only insignificantly increased by the housing 1. FIG. 5 shows a perspective illustration of the motor from FIG. 4. The drawn arrows again indicate the cooling-air stream. Said cooling-air stream flows against the rear face of the motor into the fan 10, through the cooling ducts in the housing 1, and then out of the openings 11 in the housing 1. In this exemplary embodiment, each cooling duct has its own associated opening 11.

The housing 1 with cooling ducts which are open toward the inside can be universally employed for a large number of electrical machines. In addition, different cooling concepts, such as water cooling, external ventilation or self-cooling, can be implemented with a housing of this type without the external dimensions of the electrical machine being substantially changed.

What is claimed is:

1. An electrical machine, comprising:
   a housing defined by an axis and designed as an extruded aluminum profile, said housing including an outer wall, at least one cooling duct, which extends radially within the outer wall and is closed off toward the outside by the outer wall, for allowing a transport of a coolant entering the housing in a direction of the axis, and a plurality of webs, which form walls of the at least one cooling duct, said webs projecting radially inward and defining a cylindrical free space inside the housing;
   a stator core having an axial length which is shorter than an axial length of the housing, said webs of the housing being constructed to hold the stator core, said stator having a stator core and an end winding extending out from an end face of the stator core;
   at least one pipe disposed axially upstream or downstream of the stator core and closing off the at least one cooling duct at least partially toward the cylindrical free space; and
   a bearing plate constructed to support a bearing at a location radially directly underneath the end winding and connected to the pipe such as to deflect an axial flow of coolant through the coolant duct to exit through a coolant outlet disposed in the housing at a location radially above the pipe.

2. The electrical machine of claim 1, wherein the housing has a cross-shaped configuration.

3. The electrical machine of claim 1, wherein the pipe closely adjoins the stator core.

4. The electrical machine of claim 1, further comprising an end plate connected in single-piece configuration with the at least one pipe.

5. The electrical machine of claim 1, wherein the end plate is constructed to deflect the axial flow of coolant by 90° toward the coolant outlet.

* * * * *